United States Patent [19]

Anello et al.

[11] Patent Number: 4,946,095

[45] Date of Patent: Aug. 7, 1990

[54] CHANGE RETURN PROTECTION DEVICE

[76] Inventors: Salvatore Anello, Box 313, Tuckers Corner Rd., Highland, N.Y. 12528; Nathan Turk, Rocking Horse Ranch, Rte. 44-55, Highland, N.Y. 12528

[21] Appl. No.: 283,583

[22] Filed: Dec. 13, 1988

Related U.S. Application Data

[63] Continuation-in-part of Ser. No. 275,074, Nov. 22, 1988.

[51] Int. Cl.[5] .............................................. B65G 11/04

[52] U.S. Cl. .................................... 232/57.5; 379/145

[58] Field of Search ........................ 379/145, 150, 346; 232/57.5

[56] References Cited

U.S. PATENT DOCUMENTS

| | | | |
|---|---|---|---|
| 1,921,072 | 8/1933 | Edwards . | |
| 1,951,887 | 3/1934 | Templeton et al. . | |
| 1,977,884 | 10/1934 | Long . | |
| 2,037,174 | 4/1936 | Mills et al. . | |
| 3,116,013 | 12/1963 | Eno et al. | 232/57.5 |
| 3,148,246 | 9/1964 | Hannula | 232/57.5 X |
| 3,302,872 | 2/1967 | Nawman | 232/57.5 |
| 3,307,779 | 3/1967 | Hamilton | 232/57.5 |
| 4,094,440 | 6/1978 | Lotspeich . | |
| 4,180,183 | 12/1979 | Muller . | |
| 4,296,872 | 10/1981 | Mitchell et al. . | |
| 4,735,809 | 4/1988 | Wuethrich . | |
| 4,761,809 | 8/1988 | Brancati | 379/145 X |

*Primary Examiner*—Robert W. Gibson, Jr.
*Attorney, Agent, or Firm*—Morgan & Finnegan

[57] ABSTRACT

A change return protection device is disclosed which prevents thieves for stuffing flexible material into coin-operated machine's, coin return chutes. The device seals off the change return's change return chute when the change return door is opened, and it prevents stuffing of the change return chute by also incorporating a blocking flap and a slot blocking plate around which the flexible material cannot be inserted. The device is suitable for use in existing change return mechanisms.

4 Claims, 2 Drawing Sheets

CHANGE RETURN PROTECTION DEVICE

RELATED APPLICATION

This application is a continuation-in-part of application Ser. No. 275,074, filed Nov. 22, 1988.

BACKGROUND AND OBJECTS OF THE INVENTION

1. Field of the Invention

The present invention relates generally to a coin return protection device and more particularly, to a device which can be attached to existing payphone coin return doors to prevent tampering with the coin return mechanisms.

2. Description of the Prior Art

The payphone coin return mechanisms in use today typically comprise a hollow body having front and back walls and top and bottom walls which are joined by opposing side walls. An intermediate wall is situated between the top and bottom walls and extends from a point below the back of the top wall downwardly toward the front wall to define with the top wall and the side walls a throat for the coin return chute. The bottom wall of the chute extends downwardly from the front wall and then rearwardly upwardly toward the back wall. It thus forms with the intermediate and side walls a trough portion for the chute, the trough extending below and forwardly and rearwardly of the throat.

The front wall of the chute is provided with an opening which is normally closed by a pivotally mounted door and through which a finger of a caller can be inserted to retrieve returned coins delivered to the trough. Another opening is provided at the rear of the top wall of the chute. This opening receives coins which are being returned to a caller from the payphone's coin return mechanism. After the returned coins pass through this opening they fall onto the intermediate wall of the throat and slide downward to the trough at the bottom wall for retrieval by the caller as already described.

Theft of coins from payphone coin return chutes as a result of "stuffing" the coin return chute has been a continuing problem in payphones having coin returns of the type described above. Stuffing has been a serious problem for many years, and until now no effective way of preventing it had been found. To "stuff" a payphone, the would-be thief inserts a compressible obstruction through the coin return door, past the opening in the front wall and trough, into the throat of the chute. The obstructing material is typically wadding, paper, fabric or plastic sheeting, and it is used to prevent the coins which would otherwise be returned to the payphone user from falling through the coin return chute. After sufficient time passes a sizable number of coins accumulates behind the obstructing material. The blockage is removed and the freed coins cascade into the return. The obstructing material can be cleared out either manually or by using implements such as a pick or hook. Some individuals ignite the foreign material so that it burns and turns to ash. This latter technique may also damage the payphone's internal mechanisms.

Early attempts at preventing this type of theft centered around designing the payphone coin return mechanism in such a way that it became disabled when the chute was stuffed. This type of solution is described, for example, in U.S. Pat. Nos.: 1,887,576; 1,901,944; 1,921,071; 1,921,072; and 2,004,615. Although disabling the coin return mechanism prevented the theft of coins, it also made it impossible to return coins to the caller in the event a call was not completed. Disabling the coin return mechanism was not an entirely satisfactory solution to the theft problem, since it was not feasible in pay stations where access to an operator was not available.

More recent attempts to prevent this type of theft involved designing a return chute which is more difficult to stuff. In particular, the back wall of the chute below the intermediate wall was brought forward, reducing the area of the trough available for a thief to work in when attempting to insert the stuffing material. The back wall was replaced by an opening closed by a pivoting door so that the obstructing material might pass out of the chute. These modifications, however, have not proved successful and there is still a need for a more effective way of preventing the stuffing of payphone coin return chutes.

U.S. Pat. No. 4,761,809 describes another attempt to design an "unstuffable" coin return. A tubular member having pointed teeth at its front end is inserted into the coin return chute; the teeth point toward the coin return door. A blade having additional sharpened teeth is attached to the lower surface of the intermediate wall of the throat. All these teeth are intended to slice up obstructing material so it cannot form blockages, but actual usage of the invention reveals that these teeth facilitate stuffing because they catch and hold the wadding.

The payphone stuffing problem is an old one and until now no satisfactory solution has been found. This crime costs the phone companies enormous sums of money. Although the phone companies would not normally collect the returned money lost to the "stuffers," since in properly working payphones the coins are returned for uncompleted calls, the phone companies usually have to refund the lost money to their customers. Furthermore, each phone company must employ personnel to investigate reports of payphones failing to return change, employ maintenance workers who examine and repair "stuffed" phones, and have accounting and payment systems in place to refund lost money to payphone users. The overall administrative cost of repairing payphones and refunding lost money are quite high, and there is a substantial need for an inexpensive device that reliably prevents stuffing which can be quickly and simply installed in an existing payphone.

OBJECTS OF THE INVENTION

It is therefore an object of the present invention to provide a new coin return protection device especially suited for use in payphones or coin operated vending machines which are subject to theft by "stuffing."

Another object of the invention is to provide a coin return protection device which is simple in construction and inexpensive to manufacture.

Still a further object of the invention is to provide a coin return protection device that can be quickly and easily installed in existing payphones or coin-operated vending machines yet which is sturdy, durable and completely effective in preventing "stuffing" the coin return with foreign matter.

Other objects and advantages of the invention will be obvious based on the following description.

The accompanying drawings, referred to herein and constituting a part hereof, illustrate preferred embodiments of the invention, and together with the description, serve to explain the principles of the invention.

DESCRIPTION OF THE PREFERRED EMBODIMENTS

Referring now more particularly to FIGS. 1-4 of the accompanying drawings, there is illustrated a preferred embodiment of a coin return protection device constructed in accordance with the present invention. As here preferably embodied, the machine is advantageously adapted for use in public payphone coin returns.

While the apparatus of our invention as here embodied is particularly adapted to and was designed for use in public payphone coin returns, the principles of operation of the invention are not limited to such usage. However, since the invention is especially suitable for such usage, reference will be made hereinafter thereto in order to provide an example of a practical and useful embodiment of the invention.

It will also be understood that the present invention is not limited to use in payphones, but may be adapted to use in other types of coin-operated machinery by slight changes in dimensions.

Figure 1:
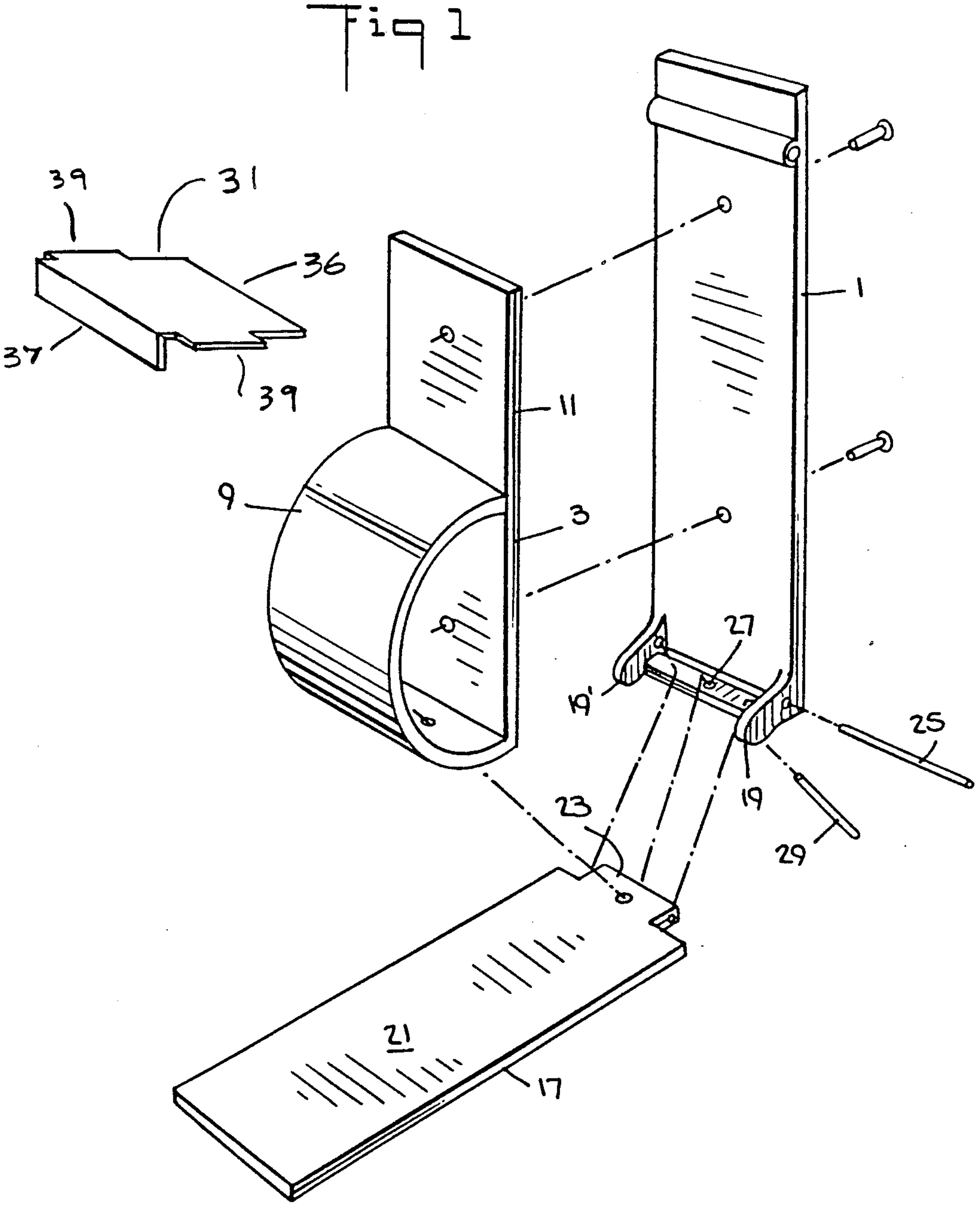
FIG. 1 is an exploded view of the coin return chute and door mounted with the device of the present invention.

FIG. 1 depicts in exploded form the preferred embodiment of the present invention. Door 1, an existing payphone component, serves as the anchor to which the invention is attached. The invention is made up of four parts, a sealing plate 3, a blocking flap 17, and an anchor pin 29, and an L-plate 31.

Sealing plate 3 has two regions, a curved sealing projection 9 and a strip-shaped attachment area 11. It is roughly P-shaped. It can be made from a single piece of material, or several pieces which have been joined. Sealing plate 3 can be manufactured in a variety of ways, such as from a bent piece of strip stock, cast from a mold as a solid body, or made from two joined pieces of strip stock, one corresponding to sealing projection 9, one to attachment area 11, which are then bonded together. In the preferred embodiment of the invention sealing plate 3 is made of a bent strip of aluminum or nonmagnetic stainless steel. The material used to form sealing plate 3 should be nonmagnetic so that tamperers cannot block return passage 15 by attaching magnets to the top of sealing projection 9.

Curved sealing projection 9 should be approximately as wide as the interior of coin return passage 15. It has been found that the shape and size of sealing projection 9 are critical; if it is too small coin return passage 15 will not be sealed off until door 1 has almost entirely opened. If sealing projection 9 is too large it will block off return passage 15 before door 1 can be opened enough to admit a user's finger. Sealing projection 9 is properly sized if it blocks off return passage 15 after door 1 has opened enough to for a payphone user to insert his finger to withdraw any returned change.

If the invention is to function properly, sealing projection 9 should be the correct shape and size. If the shape of sealing projection 9 is wrong, returned coins may stick on its upper surface. In the preferred embodiment the shape of this piece is that of an ellipse bisected across its major axis. In general it is important that the sealing projection 9 have very little horizontal or nearly-horizontal surface area for the coins to rest on. Those skilled in the art will readily appreciate that if payphones built by different manufacturers have different return chute dimensions the size and shape of sealing projection 9 will have to be correspondingly adjusted.

In the preferred embodiment of the invention sealing plate 3 is attached to the back side of payphone door 1 by a plurality of rivets 13. Other attachment means well-known to those skilled in the mechanical arts such as screws, bolts and welds are equally acceptable and they can be used without affecting how the device operates.

FIG. 1 shows blocking flap 17 which is designed to be mounted on the door 1 of a payphone. Because the bottom of payphone door 1 has internal tabs 19 which extend inwardly from its right and left sides, blocking flap 17 is configured to have a wide upper neck region 21 which is rectangular in shape and only slightly narrower in width than the interior of the coin return and a narrower lower region 23 which is only slightly narrower than the space between the two tabs 19 at the bottom of door 1. Blocking flap 17 is attached to door 1 by a press-fit pin 25 which passes through one internal tab 19, through a hole widthwise through the blocking flap 17 and through the other internal tab 19'. This fastening method possesses the advantages of low cost, simplicity and sturdiness, but other means of attaching blocking flap 17 to door 1 such as screws, bolts and welds are equally satisfactory.

Existing coin return mechanisms often have a slot 33 in the bottom wall of the coin return passage 15. In the present invention, L-plate 31 is attached to the bottom of the coin return passage 15 to prevent stuffing material from passing up through slot 33. The long leg 36 of the L-plate 31 covers slot 33. Long leg 36 is dimensioned to allow door 1 to open sufficiently to admit a user's finger while simultaneously permitting sealing projection 9 to block return passage 15. The short leg 37 of L-plate 31 serves to further hinder the insertion of stuffing material.

In the preferred embodiment of the invention L-plate 31 is attached to the existing coin return by two projecting tabs 39 which are suitably dimensioned to engage existing slots in the coin return mechanism. Those skilled in the art will recognize that other attachment means including, but not limited to threaded fasteners, rivets and adhesives may be employed.

Figure 2:
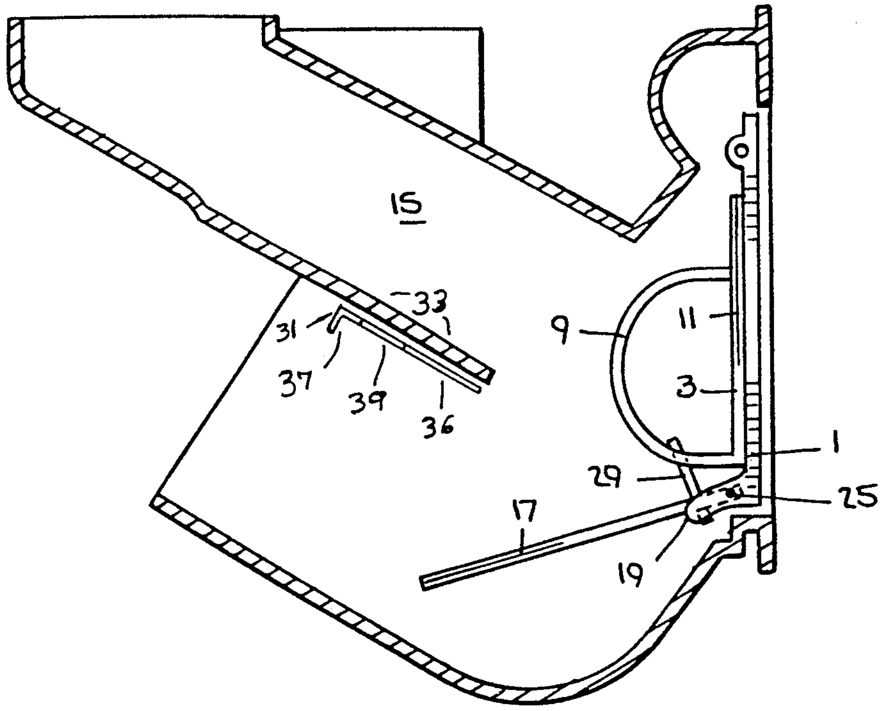
FIG. 2 shows a cross-section of the device of the present invention as mounted on to the door of a coin return box.

FIG. 2 shows the instant invention in cross-section, as mounted in a payphone. Those skilled in the mechanical arts will recognize that when force is applied normal to blocking flap 17 the resulting torque will tend to rotate blocking flap 17, loosening press fit pin 25. Regardless of how blocking flap 17 is attached to door 1 the torque generated at its point of attachment will cause it to move, weakening either the attachment means or bending blocking flap 17.

Anchoring means are therefore necessary to more securely join blocking flap 17 to door 1. In the preferred embodiment these means take the form of a press fit anchor pin 29 which passes through a hole 27 in the bottom lip of door 1, then through a hole in blocking flap 17, and finally through a hole in the bottom of the curved region of sealing projection 9. These holes can be drilled, bored, reamed or stamped. Equivalent fastening means such as welding are also equally acceptable.

In an alternate preferred embodiment of the present invention, three separate pieces of the invention, sealing plate 3, blocking flap 17, and pin 25 are replaced by a single unitary structure which is attached to door 1. This structure can be cast, machined, forged or made by any other equivalent means. It should have the same configuration as the preferred embodiment already described.

The invention in its broader aspects is not limited to the specific embodiments herein shown and described but departures may be made therefrom within the scope of the accompanying claims, without departing from the principles of the invention and without sacrificing its chief advantages.

We claim:

1. A change return protection device for installation on the back side of a door to a coin return box connected to a coin return passage having a slotted lower wall of a coin operated machine, comprising:

means for preventing the insertion of obstructing material past said coin return door;

means for sealing off the coin return passage of the coin-operated machine when said door is opened to allow a user to retrieve returned coinage; and means for blocking said slotted lower wall.

2. A change return protection device for installation on the back side of a door to a coin return box connected to a coin return passage having a slotted lower wall of a coin-operated machine, comprising:

means for preventing the insertion of obstructing material past said coin return door;

means for sealing off the coin return passage of the coin-operated machine when said door is opened to allow a user to retrieve returned coinage; and an L-shaped plate for blocking said slotted lower wall.

3. A change return protection device for installation on the back side of a door to a coin box connected to a coin return passage having a slotted lower wall of a coin-operated machine, comprising:

means for preventing the insertion of obstruction material past said coin return door;

means for sealing off a coin return passage of the coin operated machine when said door is opened to allow a user to retrieve returned coinage;

means for bracing said preventing means and said sealing means so they do not shift their orientations with respect to one another; and means for blocking said slotted lower wall, disposed beneath said lower wall.

4. A change return protection device as in claim 3 wherein said slot blocking means comprises an L-shaped plate.

* * * * *